TUNNEL DIODE LOGIC CIRCUIT

Filed March 29, 1965

INVENTORS
FRANCIS J. ASH
JACK S. CUBERT

BY J. Donald Weber, Jr.
ATTORNEY 3,354,324
TUNNEL DIODE LOGIC CIRCUIT
Jack S. Cubert, Willow Grove, and Francis J. Ash, Philadelphia, Pa., assignors to Sperry Rand Corporation, New York, N.Y., a corporation of Delaware
Filed Mar. 29, 1965, Ser. No. 443,477
13 Claims. (Cl. 307—88.5)

ABSTRACT OF THE DISCLOSURE

The present invention provides circuitry means for causing a tunnel diode to conduct in one of its two normal states of conduction. The tunnel diode is biased to a point of conduction wherefrom it can be easily switched from the low voltage state to the high voltage state. A current steering circuit is connected to the anode of the tunnel diode and this current steering circuit is further connected to a source of clock pulses and a source of input pulses. The current steering circuit includes anode-to-anode connected silicon and germanium diodes. The circuit operates such that if there is an input to this current steering circuit at the same time that there is a clock pulse, the tunnel diode will be switched to the high voltage condition. On the other hand, if there is no input signal at the time that the clock pulse appears, the current of the clock pulse is steered away from the anode of the tunnel diode and the tunnel diode is not transferred into the high voltage state.

This invention is related to a circuit which performs logic; and, more particularly, to a circuit which utilizes a tunnel diode to perform digital logic operations at ultra-high speeds.

In the manufacture and design of many types of equipment, for example high speed calculating machines, there is the need for various electronic logic circuits. In particular, many electronic calculating machines which utilize digital operation, require logic circuits which operate on and produce digital information in the form of electrical signals. Since one attribute which is desired in this type of machine, is high speed operation, it is obviously advantageous to utilize electronic logic circuits which operate at high speeds.

The advent of the tunnel diode as a component for use in electronic circuits has introduced an ultra high speed component for such circuits. The tunnel diode is characterized by two separate voltage states and is capable of switching from one of its voltage states to the other voltage state in extremely small times. The smaller the time required for switching, the faster the operation of the circuit.

With these facts in mind, the instant circuit was developed. The instant circuit comprises an electronic logic circuit which operates on and produces digital information. Furthermore, the instant circuit uses a tunnel diode to perform a high speed switching operation. Basically, the circuit comprises a bistable tunnel diode as the active element thereof. A unique current switching network is connected between the tunnel diode and the input to the circuit. A clocking device which supplies periodic signals is connected to the current switching network and alternatively supplies current to the input source or to the tunnel diode depending upon the electrical condition of the input source. When signals are applied to the tunnel diode, the tunnel diode is switched from one stable condition to another stable condition and the output signal detected at the tunnel diode signifies the condition thereof in the form of a digital or level output.

Thus, one object of this invention is to provide a novel logic circuit.

Another object of this invention is to provide an electronic logic circuit utilizing tunnel diodes.

Another object of this invention is to provide an electronic digital logic circuit utilizing tunnel diodes as high speed switching devices.

Another object of this invention is to provide an electronic digital logic circuit operating at high speeds and utilizing a current steering network as a control means.

Another object of this invention is to provide an electronic digital logic circuit which is capable of being cascaded in order to perform a plurality of levels of logic.

Another object of this invention is to provide an electronic digital logic circuit which avoids close tolerance requirements on the tunnel diode parameters.

These and other objects and advantages of this invention will become more readily apparent when the following description is read in conjunction with the drawings attached hereto.

Figure 1:
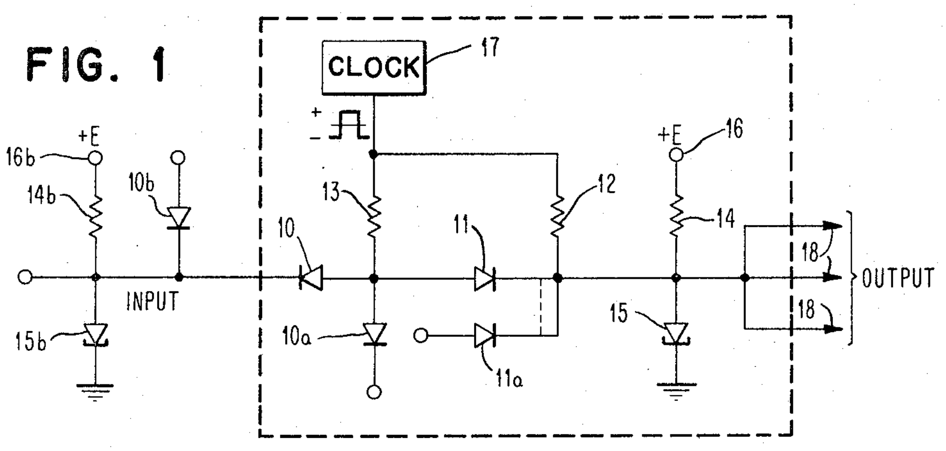
FIGURE 1 is a schematic diagram of one embodiment of the circuit which forms the instant invention.

Referring now to FIGURE 1, the schematic diagram of one embodiment of this invention shows the basic circuit configuration enclosed within the dashed outline 100. The input device, which is so labeled, is merely illustrative of one type of input and is not meant to be a limitation of the invention. However, with the illustrated input means, there is meant to be indicated the concept of cascading a plurality of the circuits as shown within the dashed outline.

The input signal supplying means comprises a source **16*b* which supplies a potential +E which may be on the order of, for example, +10 volts. This source 16*b* is connected via resistor 14*b*, which may be on the order of approximately 1500 ohms, to the anode of tunnel diode 15*b*. The cathode of tunnel diode 15*b* is connected to a suitable reference potential, for example ground, to which all potentials mentioned herein are referenced. The type of tunnel diode utilized is not critical but for the values suggested supra, a tunnel diode having a peak current ($I_p$) on the order of 10 milliamperes would be utilized. Of course, if a tunnel diode having a higher or lower peak current value is utilized, the values for the biasing network would be varied. Connected to the anode of the tunnel diode 15*b* is the cathode of the coupling diode 10. To illustrate the fact that the plurality of coupling diodes may be utilized whereby a plurality of circuits identical to that shown in dashed outline 100 may be connected to a single input source, coupling diodes 10 and 10*b* are depicted. Diode 10*b* has no connection shown at the anode thereof; however, it is to be understood that the same connections as are made to the cathode of coupling diode 10** may be utilized.

Connected to the anode of coupling diode 10 is the cathode of rectifier diode 11. Also connected to the jointly coupled anodes of diodes 10 and 11 is one terminal of resistor 13 which may be on the order of 1000 ohms. Another terminal of resistor 13 is connected to clock source 17. Clock source 17 may be any suitable source capable of supplying a potential of −1 volt as a reference potential and periodically recurring clock signals having a peak positive potential of approximately +3 volts. Of course, the voltage levels may be varied as desired. Also connected to the clock source 17 is one terminal of resistor 12 which may be on the order of 1000 ohms. Another terminal of resistor 12 is connected to the cathode of rectifier diode 11. Diodes **10*a* and 11*a* are shown connected substantially in parallel with the counterpart diodes 10 and 11 and are used to illustrate the concept that additional diodes may be connected, as shown, in order to couple together additional logic circuits such as the one described herein. By coupling together circuits via diodes 10***a* and 11*a*, multilevel logic may be achieved.

It should be noted at this point, that the diodes 10 and 11 may be any suitable diodes. However, it is suggested in this embodiment that diode 10 is a germanium diode and diode 11 is a silicon diode. The primary consideration is, of course, that the forward voltage drop requirements of diode 10 be substantially less than the forward voltage requirements of diode 11. A similar arrangement may be provided by utilizing a backward diode for diode 10 and an ordinary rectifier diode for diode 11. However, so long as the difference in the forward voltage drop requirement is maintained, the types of diodes utilized is not critical.

Connected to the cathode of diode 11 is the anode of tunnel diode 15 which may be similar to tunnel diode 15*b*. Again the cathode of tunnel diode 15 is connected to a suitable reference potential source such as ground. The anode of tunnel diode 15 is connected to a bias source which supplies a substantially constant current which biases the tunnel diode for bistable operation. Such a constant current source is provided by utilizing the positive potential source 16 which supplies a potential of +E which may be in the order of +10 volts and a series connected resistor 14 which may be on the order of 1000 ohms. Also connected to the anode of tunnel diode 15 are the output terminals 18 (a plurality of which are shown for convenience). As noted supra, the input device is utilized to suggest the possibility of cascading a plurality of similar circuits. Therefore, in FIGURE 1 components which are similar in function bear similar reference numerals with a letter suffix applied thereto.

Figure 2:
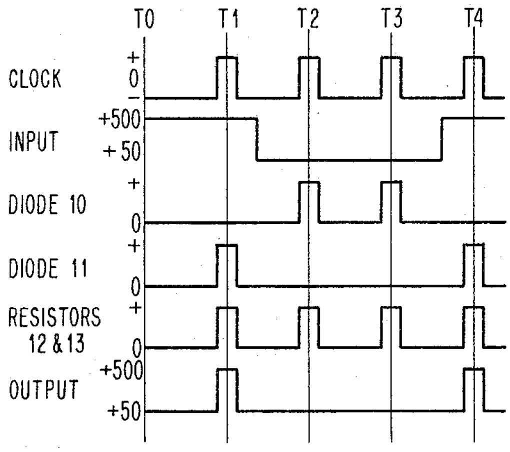
FIGURE 2 is a timing diagram which graphically represents the signals applied to and supplied by various components of the circuit shown in FIGURE 1.

The operation of the circuit shown in FIGURE 1 is more readily understood by concurrent reference to the graphic timing diagram shown in FIGURE 2. At time T0, the input signal is illustratively shown as a high level signal. In view of the fact that the input signal is supplied by a tunnel diode in this embodiment, this input signal would be at approximately +500 millivolts. The clock signal is shown producing a negative base or reference potential. Because of these conditions the diodes 10, 11 are reverse biased. That is, the potential applied to the anodes of the diodes is a negative potential whereas the potential supplied to the cathodes thereof is positive. Similarly, the current flow through resistors 12 and 13 is negligible, at most. Also, it is initially assumed that the tunnel diode 15 has been reset to the low level condition whereby the output signal is approximately +50 millivolts. Of course, the invention is not limited to the potentials designated and for a more generic showing, the high level signal may be considered to be a binary "1" and low level signal considered to be a binary "0" signal or the like. Of course, the opposite arrangement may be provided but this is a function of the coding which is desirable. Furthermore, it should be noted that a positive signal, when applied to the waveforms associated with the diodes or resistors, indicates the existence of current in the pertinent component.

Thus, at time period T1 a positive going clock pulse signal is supplied by source 17. This signal is a pulse of approximately +3 volts magnitude. Since the input signal (at the cathode of diode 10) is at the +500 millivolts level, the anode of diode 10 must attain the potential of approximately +750 millivolts in order to produce significant current conduction therethrough. However, diode 11 will begin to conduct a substantial current therethrough when the potential at the anode thereof attains the level of approximately +550 millivolts. That is, diode 11 exhibits a forward voltage drop of about 500 millivolts and the cathode thereof is biased to about +50 millivolts by tunnel diode 15. Since diode 10 remains reverse biased, current flows from source 17 through the series current path comprising resistor 13 and diode 11 parallel with resistor 12. This current is added to the current supplied to tunnel diode 15 by the bias source. The total current is sufficient to switch tunnel diode 15 from the low level operating condition to the high level operating condition. Thus, the output detected at terminal 18 switches from the +50 to the +500 millivolts level.

At some arbitrary time between time periods T1 and T2, the input signal is shown to switch from the high to the low level. Also, it is assumed that tunnel diode 15 has been reset to the low level condition by any suitable reset means.

Thus, at time period T2 the clock signal is again supplied by clock source 17. However, at this time, coupling diode 10 conducts significant current when the potential at the anode thereof reaches the level of approximately +300 millivolts. Of course, this conduction effectively clamps the potential at the anodes of the diodes below the level of +550 millivolts which is required for conduction through rectifier diode 11. Consequently, the current produced by the clock signal now follows the current path through resistor 12 to tunnel diode 15 and through resistor 13 and diode 10 in series, to the input source.

Because of the component values and the various circuit parameters, it becomes apparent that in the circuit conditions shown at time period T2, a current of approximately 2.95 milliamperes flows through resistor 12 to tunnel diode 15 while a current of approximately 2.7 milliamperes flows through resistor 13 and diode 10 to the input source.

If tunnel diode 15 were initially biased to the 6 milliampere level (assuming a 10 milliampere peak current tunnel diode), the 2.95 milliampere current through resistor 12 at time period T2 is insufficient to switch the tunnel diode from the low to the high voltage operating region. Contrariwise, the switching which took place at time period T1 was produced inasmuch as the current through resistor 12 was, during that time period, also approximately 2.95 milliamperes and the current through resistor 13 and series connected diode 11 was on the order of about 2.5 milliamperes. The combination of these two currents at the anode of tunnel diode 15 provides a net increase or signal input of approximately 5.5 milliamperes to the tunnel diode, in addition to the bias current of approximately 6 milliamperes. The total current supplied to the tunnel diode is, then, on the order of about 11.5 milliamperes which provides the theoretical switching current plus a fifteen percent tolerance. This tolerance may be expanded somewhat by varying the parameters or the values of the components in the circuit. However, the suggested tolerance is, generally, more than adequate for tunnel diode operation.

At time period T3, the operation of the circuit is identical with the operation of the circuit during time period T2. Again, it is assumed that tunnel diode 15 has been reset to the low voltage operating condition between each of the time periods.

Between the time period T3 and T4, at some arbitrary time which is not a limitation of the invention, the input signal switches from the low to the high voltage level. The application of the high level input signal by the input source effectively reverse biases coupling diode 10 and forces the current produced by the clock signals to flow through resistor 12 and the parallel branch comprising resistor 13 and diode 11. This operation is identical with the operation discussed at time period T1. This operation, furthermore, produces a large current signal in tunnel diode 15 which signal is sufficient to switch the tunnel diode to the high voltage operating condition.

Thus, there is shown a digital electronic logic circuit which utilizes a tunnel diode to perform a high speed operation. It is to be understood, of course, that multilevel logic may be achieved by properly biasing various circuit components such that a plurality of input signals supplied to the coupling diodes, for example diodes 10 and 10*a*, are required in order to provide a sufficiently high threshold to cause conduction through diodes 11. However, this type of circuit operation is meant to be included within this description.

Figure 3:
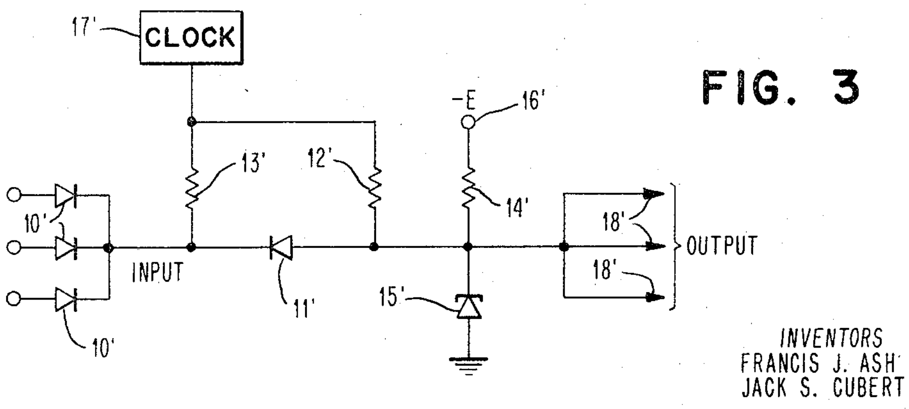
FIGURE 3 is a schematic diagram of another embodiment of the circuit which forms the subject matter for the instant invention.

Referring now to FIGURE 3, there is shown another embodiment of the invention. A schematic diagram shown in FIGURE 3 utilizes inverted polarity of the diodes in order that complementary logic functions may be performed whereby the circuit of FIGURE 3 may be combined with the circuit of the FIGURE 1 to provide logic systems with increased capabilities. Components which are shown in FIGURE 3 bear similar reference numerals to similar components shown in FIGURE 1 with the addition of a prime. For example, the coupling diodes are designated as 10'.

In the operation of this circuit, the tunnel diode is biased to the low voltage operating condition whereby the output would be a negative potential of about −50 millivolts. In addition, the input signals supplied to coupling diodes 10' would be negative signals which would reverse bias these diodes. A negative going signal supplied by clock source 17' periodically provides a signal which causes current flow in resistors 12' and 13'. However, in the alternative, and depending upon the input signal supplied to the diodes 10', current may or may not flow in diode 11'. As in the case of the embodiment shown in FIGURE 1, current flow in diode 11' would cause tunnel diode 15 to be switched to the high voltage operating condition thereby supplying a low level output signal of approximately −500 millivolts. Since the operation of the circuit shown in FIGURE 3 is substantially similar to the operation of the circuit shown in FIGURE 1 with the exception of opposite polarities of signals and the like, a separate timing diagram is deemed unnecessary.

Since the tunnel diode is described as operating in the return to zero mode in this embodiment, it is contemplated that the negative reference or base potential supplied by the clock source 17 draws sufficient current through resistor 12 in order to reset tunnel diode 15. However, this is not required and, in fact, it may be desirable to have a separate reset means (not shown) of which several are known. In the event that the clock source does, in fact, perform the reset function, the resetting may be accomplished by producing a delay after the application of the positive going signal before the return of the clock signal to the negative base level. On the other hand, a sinusoidal clock signal may be applied wherein a certain delay in the resetting of the tunnel diode would be inherent since the sinusoidal clock signal would be required to achieve a certain predetermined negative level before the tunnel diode would be reset.

In the event that a number of the circuits such as the one described are connected together in cascade, the clocking arrangement would be most advantageously provided by having a certain minimum overlap of the setting portion of the clocking arrangement for one stage of the cascaded network with the resetting clocking arrangement of the next adjacent (i.e. preceding or succeeding) stage. The clocking arrangement which is provided for the circuit, whether utilized individually or in cascade arrangement, is not meant to limit the scope of this invention. Rather the clocking becomes of importance only when a large number of circuits are connected together in cascade and when the most rapid operation of the cascaded circuitry is desired.

The embodiments of the invention in which an exclusive property or privilege is claimed are defined as follows:

1. In combination, tunnel diode means, bias means connected to said tunnel diode means for biasing said tunnel diode for bistable operation, input means, first and second rectifier diodes connected in series between said input means and said tunnel diode means, clock pulse supplying means, first resistor means connected between said clock pulse supplying means and the series connection between said first and second diodes, second resistor means connected between said clock pulse supplying means and the connection between said series connected diodes and said tunnel diode, and output means connected to said tunnel diode.

2. The logic circuit recited in claim 1, wherein said series connected diodes are connected in opposing polarity and exhibit different forward voltage drop requirements.

3. A logic circuit comprising, tunnel diode means, bias means connected to said tunnel diode means for biasing said tunnel diode for bistable operation, input means for selectively supplying signals having two different levels, first and second rectifier diodes connected in series between said input means and said tunnel diode means, pulse supplying means for supplying regularly recurring pulses, first impedance means connected between said pulse supplying means and the series connection between said first and second diodes, second impedance means connected between said pulse supplying means and the connection between said series connected diodes and said tunnel diode, and output means connected to said tunnel diode, one level of said input signals selectively reverse biasing one of said diodes whereby a pulse supplied by said pulse supplying means is applied to said tunnel diode.

4. The logic circuit recited in claim 3, wherein said series connected diodes are connected in opposing polarity and said first diode exhibits a lower forward voltage drop requirement than said second diode.

5. An electrical circuit comprising, tunnel diode means, said tunnel diode means exhibiting high and low voltage operating states, bias means connected to said tunnel diode means for biasing said tunnel diode for bistable operation, said tunnel diode normally residing in said low voltage operating state, input means for supplying signals having high and low levels, first and second rectifier diodes connected in series between said input means and said tunnel diode means, said first diode connected to said input means such that a high level input signal reverse biases said first diode, means for supplying regularly recurring pulses, first resistor means connected between said pulse supplying means and the series connection between said first and second diodes, and second resistor means connected between said clock pulse supplying means and the connection between said series connected diodes and said tunnel diode, said pulse supplying means selectively supplying pulses to said tunnel diode via said second diode and said second resistor means to switch said tunnel diode to said high voltage state only in the presence of a high level input signal.

6. A logic circuit comprising, tunnel diode means, said tunnel diode means exhibiting high and low voltage operating states, bias means connected to said tunnel diode means for biasing said tunnel diode or bistable operation, input means, first and second diodes connected in series between said input means and said tunnel diode means, pulse supplying means, first resistor means connected between said pulse supplying means and the series connection between said first and second diodes, second resistor means connected between said pulse supplying means and the connection between said series connected diodes and said tunnel diode, said series connected diodes being connected in opposing polarity and exhibiting different forward voltage drop characteristics, said pulse supplying means supplying current via said first and second resistor means, said input means supplying signals for selectively reverse biasing said first diode whereby current flows from said first resistor through said second diode to said tunnel diode to change the operating state thereof.

7. In combination, tunnel diode means, bias means connected to said tunnel diode means for biasing said tunnel diode for bistable operation, input means, first and second rectifier diodes connected in series opposing relation between said input means and said tunnel diode means, clock pulse supplying means, first resistor means connected between said clock pulse supplying means and the series connection between said first and second diodes, and second resistor means connected between said clock pulse supplying means and the connection between said series connected diodes and said tunnel diode.

8. A logic circuit comprising, tunnel diode means, bias means connected to said tunnel diode means for biasing said tunnel diode for bistable operation, input means for selectively supplying signals having two different levels, first and second rectifier diodes connected in series opposing relationship and to said input means and said tunnel diode means respectively, pulse supplying means for supplying regularly recurring pulses, said pulse supplying means coupled to the series connection between said first and second diodes, said pulse supplying means further coupled to the connection between said series connected diodes and said tunnel diode, and output means connected to said tunnel diodes, one level of said input signals selectively reverse biasing said first diode whereby a pulse supplied by said pulse supplying means is applied to said tunnel diode via said second diode.

9. An electrical circuit comprising, tunnel diode means, said tunnel diode means exhibiting high and low voltage operating states, bias means connected to said tunnel diode means for biasing said tunnel diode for bistable operation, said tunnel diode normally residing in said low voltage operating state, input means for supplying signals having high and low states, first rectifier diode connected to said input means such that a high level input signal reverse biases said first diode, second rectifier diode connected to said tunnel diode means, means for supplying regularly recurring pulses, first resistor means connected between said pulse supplying means and said first and second rectifier diodes, and second resistor means connected between said clock pulse supplying means and the connection between said second rectifier diode and said tunnel diode, said pulse supplying means selectively supplying pulses to said tunnel diode via said second diode and said second resistor means to switch said tunnel diode to said high voltage state only in the presence of a high voltage input signal.

10. A logic circuit comprising, tunnel diode means, said tunnel diode means exhibiting high and low voltage operating states, bias means connected to said tunnel diode means for biasing said tunnel diode or bistable operation, input means, first and second diodes having the anodes thereof connected together, the cathode of said first diode being connected to said input means and the cathode of said second diode being connected to said tunnel diode means, pulse supplying means for periodically coupling pulses, first resistance means connected between said pulse supplying means and the connection between the anodes of said first and second diodes, second resistance means connected between said pulse supplying means and the connection between the cathode of said second diode and said tunel diode, said first and second diodes exhibiting different forward voltage drop characteristics, said pulse supplying means periodically supplying current via said first and second resistance means, said current in said second resistance means being insufficient to switch the operating state of said tunnel diode, said input means supplying signals for selectively reverse biasing said first diode whereby said current in said first resistance means flows through said second diode to said tunnel diode in addition to said current in said second resistance means thereby providing sufficient current to change the operating state thereof.

11. In combination, tunnel diode means, bias means connected to said tunnel diode means for biasing said tunnel diode for bistable operation, input means, first and second rectifier diodes connected in series between said input means and said tunnel diode means, clock pulse supplying means, first resistor means connected between said clock pulse supplying means and the series connection between said first and second diodes, second resistor means connected between said clock pulse supplying means and the connection between said series connected diodes and said tunnel diode, reference potential means connected to said tunnel diode means via said second resistor means to reset said tunnel diode, and output means connected to said tunnel diode.

12. The logic circuit recited in claim 1, wherein said series connected diodes are connected in opposing polarity and exhibit different forward voltage drop requirements.

13. An electrical circuit comprising, tunnel diode means, said tunnel diode means exhibiting high and low voltage operating states, bias means connected to said tunnel diode means for biasing said tunnel diode for bistable operation, said tunnel diode normally residing in said low voltage operating state, input means for supplying signals having high and low states, first and second rectifier diodes connected in series between said input means and said tunnel diode means, said first diode connected to said input means, such that a high level input signal reverse biases said first diode, means for supplying a negative potential and regularly recurring positive potential pulses, first resistor means connected between said pulse supplying means and the series connection between said first and second diodes, second resistor means connected between said clock pulse supplying means and the connection between said series connected diodes and said tunnel diode, said pulse supplying means selectively supplying positive potential pulses to said tunnel diode via said second diode and said second resistor means to switch said tunnel diode to said high voltage state only in the presence of a high voltage input signal, said pulse supplying means supplying said negative potential to said tunnel diode in the absence of a positive pulse to switch said tunnel diode to said low voltage state, and output means connected to said tunnel diode.

References Cited

UNITED STATES PATENTS

| | | | |
|---|---|---|---|
| 2,986,652 | 5/1961 | Eachus | 307—88.5 |
| 3,040,186 | 6/1962 | Van Duzer | 307—88.5 |
| 3,155,846 | 11/1964 | Parham | 307—88.5 |
| 3,234,399 | 2/1966 | Lo Casale | 307—88.5 |

ARTHUR GAUSS, *Primary Examiner*.

B. P. DAVIS, *Assistant Examiner*.